June 26, 1962 G. M. ANDERSON 3,041,412

TELEPHONE DIALING SYSTEM

Filed Aug. 17, 1959 3 Sheets-Sheet 1

INVENTOR.
GEORGE M. ANDERSON

BY George H. Fritzinger

AGENT

June 26, 1962 G. M. ANDERSON 3,041,412

TELEPHONE DIALING SYSTEM

Filed Aug. 17, 1959 3 Sheets-Sheet 2

INVENTOR.
GEORGE M. ANDERSON
BY George H. Fritzinger
AGENT

INVENTOR.
GEORGE M. ANDERSON
BY George H. Fritzinger
AGENT 3,041,412
Patented June 26, 1962

3,041,412

TELEPHONE DIALING SYSTEM

George M. Anderson, Whippany, N.J., assignor to McGraw-Edison Company, Elgin, Ill., a corporation of Delaware Filed Aug. 17, 1959, Ser. No. 834,175
11 Claims. (Cl. 179—90)

This invention relates to an improved telephone dialing system which when activated by a source of dialing pulses representing in code form the letters and digits of telephone numbers, whether from a telephone dialing mechanism directly or from playback of a recorded medium, will produce corresponding output pulses of precise duration and periodicity notwithstanding variations in the pulses of the particular source.

Standard telephone dialing mechanisms are arranged to produce one or more pulses as respective letters or digits are dialed. Each pulse is represented by a break period followed by a make period in a telephone line. The number of pulses is identical with the digit dialed, there being one pulse for the digit "1," two pulses for the digit "2," etc. The pulses of any one train recur at about 100 millisecond intervals with the break period of each pulse having a duration of about 60 milliseconds and the make period therefore a duration of about 40 milliseconds. In order that the dialing pulses may properly operate the line switching apparatus of the telephone line, the periodicity of the pulses of any one train must be within about plus or minus 5%—i.e., the pulses must recur at intervals not less than 95 milliseconds or more than 105 milliseconds—the ratio of the break to make period of each pulse cycle must be within plus or minus 3%, and the pulse or pulse trains of respective letters and digits must be separated by interdigital periods of at least about 550 milliseconds. Only by the use of very precise apparatus can mechanical dialing mechanisms meet these close tolerance limitations.

It is known in automatic dialing machines to record the individual dialing pulses of respective letters and digits of telephone numbers and to play back the recorded pulses and feed the same into a telephone line to call selected subscribers as disclosed for example in the pending Kobler application Serial No. 657,378, filed May 6, 1957. The procedure of recording and reproducing the individual pulses of each letter and digit of telephone numbers imposes however severe tolerance limitations on the recording and reproducing equipment. For example, imperfections in the magnetic record medium, record surface irregularity such as from dust, transients in the recording and reproducing circuits and variations in the make and dropout periods of relays all produce substantial variations both in the pulses recorded and in the playback thereof. To overcome these stringent requirements on the recording and reproducing equipment the respective letters and digits have been recorded as time bands and these time bands when reproduced have been converted into dialing pulses as described in the pending Kobler et al. application Serial No. 784,258, filed December 31, 1958. By the present invention, however, a system is provided which can be activated by dialing pulses within wide tolerance limitations to recreate output pulses of precise duration and periodicity. The present invention can be used for both recording and reproducing—i.e., to record perfect pulses from an imperfect telephone dial mechanism and/or to regenerate perfect pulses from imperfect pulses played back from a recorded medium—or alternatively the dialing pulses from a telephone dial mechanism may be recorded directly on a record medium and the invention used only in the reproduction of the reproduced pulses, with the result that in either case well-nigh perfect pulses will be fed into the telephone line when the pulses are reproduced and recreated to make accurate calling connections. By way of illustration of the invention, the same is herein described for the purpose of both recording and reproducing the telephone dialing pulses.

A feature of the invention is in temporarily storing the pulses of respective letters and digits of telephone numbers in terms of corresponding mechanical units of displacement of a memory device, providing a means for creating selected numbers of precise pulses and controlling the number of pulses so recreated by the units of displacement of the memory device.

An object of the invention is to provide a new and improved means for and a method of generating dialing pulses of precise duration and periodicity responsive to imperfect sources of such pulses whether the source is a dialing mechanism direct or is an automatic dialing machine in which the pulses are first recorded and then played back.

A further object is to provide novel and economical means for carrying out the aforestated objectives and features.

In the description of the invention, reference is had to the accompanying drawings, of which:

Figure 1:
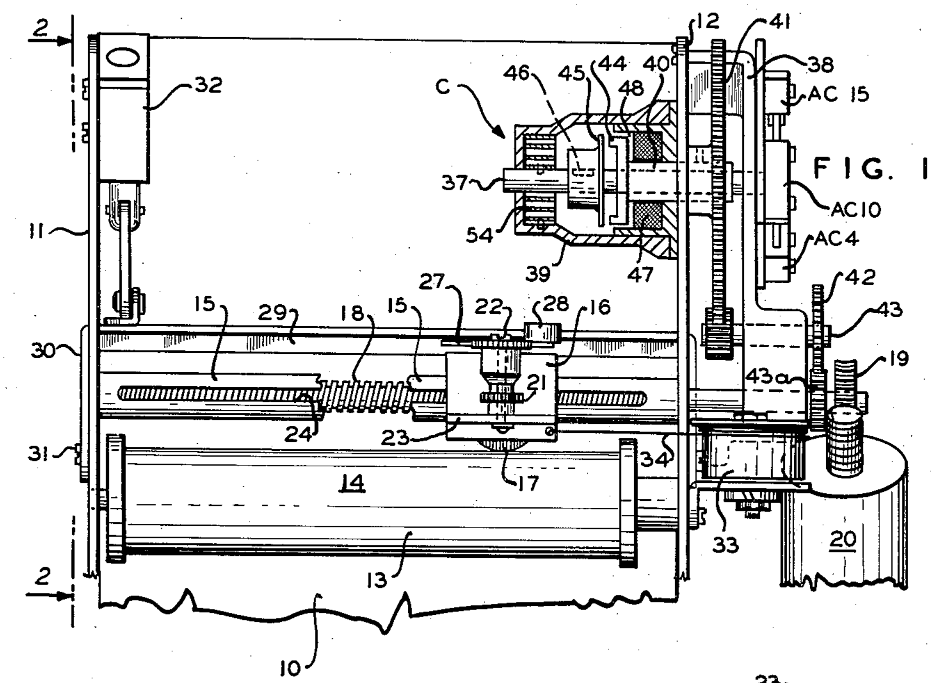
FIGURE 1 is a fractional plan view of an automatic telephone dialing machine incorporating the invention.
Figures 2, 3:
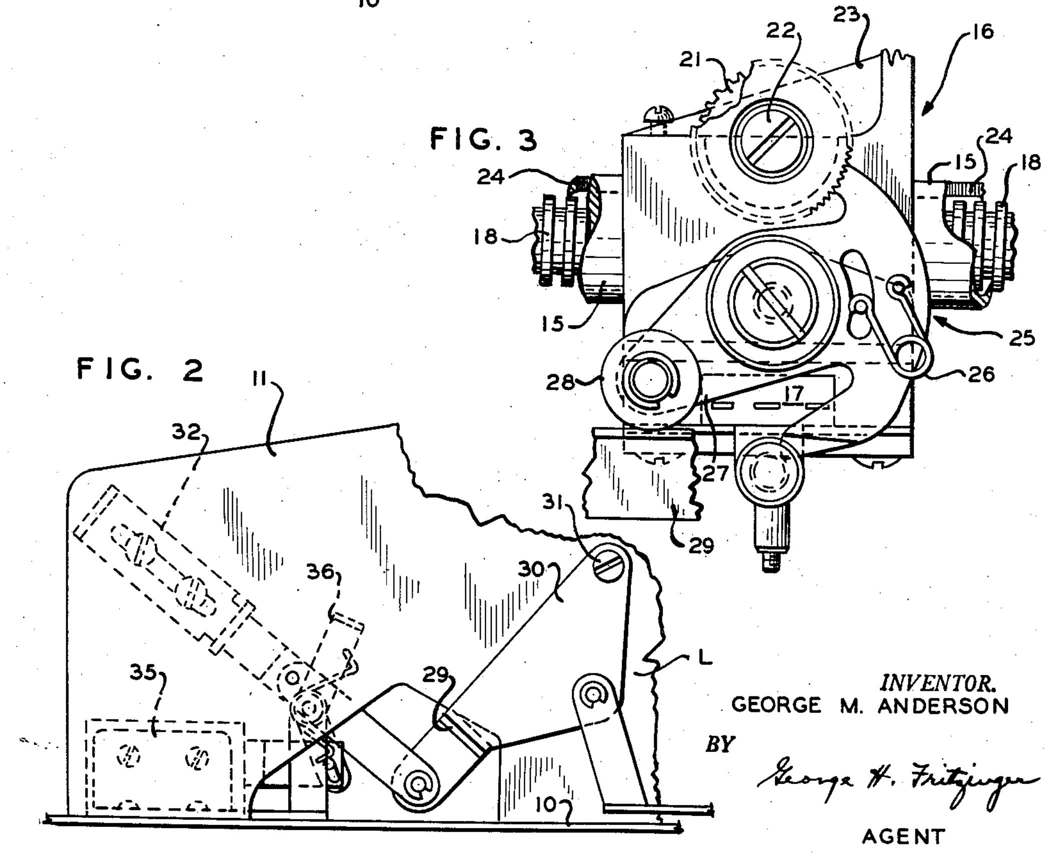
FIGURE 2 is a fractional side view of the machine taken on the line 2—2 of FIGURE 1.
FIGURE 3 is a rearward view of the recorder-reproducer head carriage of the machine.

The invention is herein particularly described in connection with an automatic dialing machine having a recording and reproducing mechanism of the character described in the pending Kobler et al. application Serial No. 784,258, hereinbefore referred to. For the present purposes, however, and for succinctness of disclosure this machine need not be described in detail. With reference to FIGURE 1, the machine comprises a frame base 10 having upright side plates 11 and 12. These plates carry a rotatable drum 13 across which is drawn a wide recording tape 14 having for example a magnetic coating of the usual type. Back of this drum is a supporting tube 15 carried at its ends by the side plates on which is slidably mounted a carriage 16 for a recorder-reproducer head 17. This head engages the record tape and is movably mounted on the carriage by means (not shown) so that it can be shifted into and out of engagement with the tape. The carriage is advanced in a leftward direction by a feed screw 18 within the tube 15. This feed screw is driven through worm gearing 19 by a motor 20. The coupling between this feed screw and the carriage comprises a circular feed nut 21 journaled on a stud 22 supported on a flange 23 of the carriage. The feed nut passes through a slot 24 in the tube 15, which extends along the length of travel of the carriage, and is locked by a pawl 25 pivoted to the backside of the carriage as shown in FIGURE 3. The pawl is biased over center by a spring 26, and has a side arm 27 carrying a roller 28. This roller is engageable at its underside by an upwardly shiftable bail 29 to disengage the pawl, and the roller is engageable at its upper side by a bell crank 36 only however when the carriage is in home position, to return the pawl into locking engagement with the feed nut. The bail 29 has side arms 30 pivoted to the side plates at 31 as shown in FIGURE 2, and is shifted upwardly by a carriage-return solenoid 32 mounted on the left side plate 11. When the pawl is released by the return solenoid 32 the carriage is returned to home position by a spring tensioned drum 33 having a cord 34 connected to the carriage and wound thereon. The means to return the pawl to lock the feed nut when the carriage is in home position comprises a clutch solenoid 35 mounted on the base plate 10 and having the bell crank 36, as shown in FIGURE 2, which is swung downwardly against the roller 28 when the solenoid is engized.

Upon starting the motor when the carriage is in home position and the feed nut locked the carriage is driven progressively in a leftward direction from home position at a speed of about .2 inch per second. The motor is of the quick-start type started by release of the dial from an operated position and stopped by the homing of the memory disk 87 of the dial pulse storage mechanism, as will appear. While the carriage is being so driven, pulse oscillations are fed to the recorder-reproducer head, operating as a recorder, to record pulses on the tape according to the letters and digits dialed. When the entire telephone number is so recorded on a track crosswise of the tape, the head is lifted from the tape and the return solenoid 32 is activated to unlock the feed nut and cause the carriage to be snapped back to home position by the spring tensioned drum. Also, when the return solenoid 32 is activated, the manual control last operated, whether it be the record, dial or reset control, as will appear, is unlatched and returned to its unoperated position by means of a linkage L partially shown and coupled to the bail 29, the linkage operating as described in the Kobler et al. application Serial No. 784,258, and details thereof being herein unnecessary to describe for purposes of the present invention.

Figure 4:
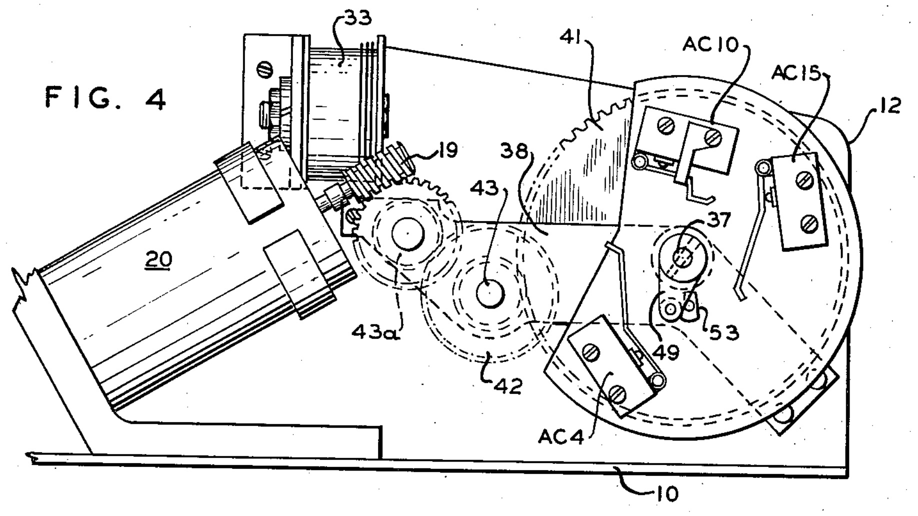
FIGURE 4 is a fractional righthand view of the machine.

Further in accordance with the description in the Kobler et al. application Serial No. 784,258, there is provided an advance clutch C for producing certain control operations responsive to measured distances of advance of the recorder-reproducer head across the record. This advance clutch comprises a shaft 37 shown in FIGURE 1, which is journaled at its outer end in a bracket 38 on the outer side of the right side plate 12 and is journaled at its inner end in the end wall of a cup-shaped housing 39 secured to the inner wall of this same side plate. On the central portion of this shaft there is journaled a sleeve 40 to the right end portion of which is secured a large gear wheel 41. This gear wheel has a permanent drive coupling with the motor 20 through a stepped gear 42 journaled on a stud 43 and a pinion gear 43*a* pinned to an end portion of the feed screw 18. On the left end of the sleeve 40 there is secured a clutch member 44 normally free from a cooperating shiftable clutch disk 45. The latter disk is made of magnetic material and is splined at 46 to the shaft 37. A coil 47 surrounds the sleeve at the right side of the clutch member 44 and is itself encased in a magnetic cup 48 which terminates at its open end short of the shiftable clutch member 45. When the coil 47 is energized the clutch members are engaged to couple the shaft 37 to the motor 20. This coupling causes the shaft 37 to be turned clockwise as seen in FIGURE 4. The coupling is such as to turn the shaft through approximately one revolution in three seconds. A radial arm 49 secured to the outer end of the shaft 37 is caused to operate a series of three switches AC4, AC10 and AC15 at time intervals of 400 milliseconds, 1000 milliseconds and 1500 milliseconds. For instance, when the clutch 44—45 is disengaged the arm 49 is held in home position against a stop pin 53 by a torsion spring 54 secured between the left end of the shaft 37 and the housing 39. When the clutch is engaged the arm 49 is moved to operate the switches AC4, AC10 and AC15 in sequence but of course if in the meantime the clutch is disengaged the arm is returned instantly by the torsion spring 54 to zero position. The functioning of the foregoing mechanism will be fully apparent from the description of the dialing system of my invention herein next described in detail with reference to FIGURES 5 to 9 inclusive.

Figure 5:
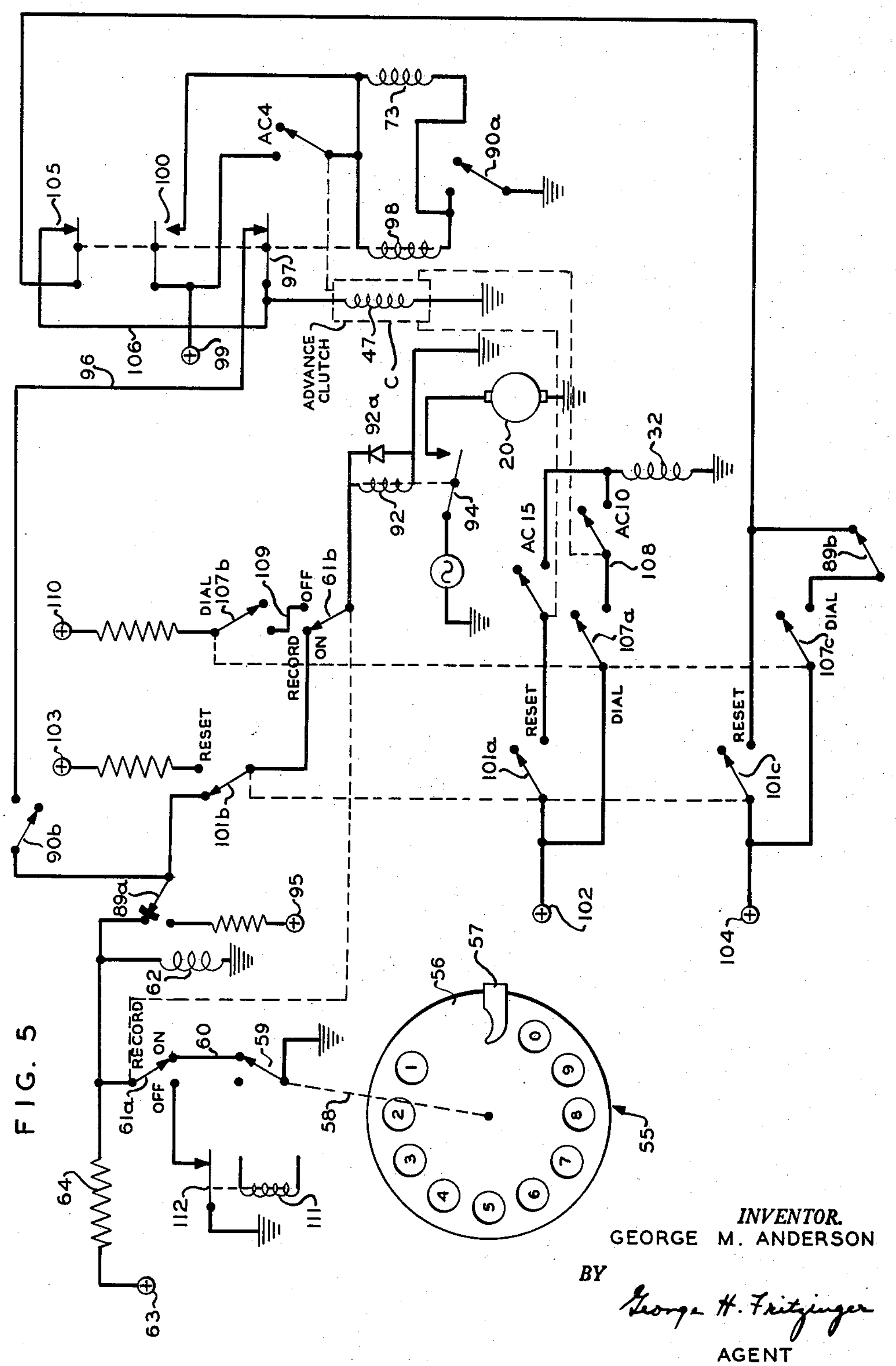
FIGURE 5 is a schematic circuit diagram of the machine.

In FIGURE 5 the reference No. 55 designates a standard telephone dialing mechanism having a dial 56 with usual finger holes and with a finger stop 57 by which the dial can be wound-up according to any of ten different positions and released to dial selected letters and digits of telephone numbers. By coupling means indicated schematically by the tie-line 58 such dial will operate a dial switch 59 to pulse the switch in the manner hereinbefore described as the dial is returned from an operated position to home position.

The dial switch 59 is connected in a circuit 60 which is completed through a record switch 61*a* when this switch is in "on" position as shown. The circuit 60 is connected in shunt with a pin clutch solenoid 62 which derives its operating power from a voltage source 63 through a voltage cut-down resistor 64. Thus, when the machine is in record condition the dial switch controls the pin clutch solenoid causing the same to be activated only when the dial switch is open. Since the dial switch is pulsed open for 60 millisecond intervals at a rate of ten times per second during return of the dial the pin clutch solenoid 62 is operated intermittently in a corresponding manner.

The pin clutch solenoid 62 is the primary control for a dial pulse storage and generating system of my invention shown in FIGURES 6 to 9. This is a differential system driven continuously by a motor 65 having a running speed, for example, of 1800 r.p.m. The motor drives a gear 66L at approximately 630 r.p.m. which is approximately at a rate of one revolution every 95 milliseconds, a rate equal to the fastest dial to be accommodated by the storage system. Also, the motor drives a second gear 66R at an exact 600 r.p.m., the return speed of a perfect dial. The gear 66L has a drive shaft in axial alignment with a driven shaft carrying a pinion gear 67 and the two shafts are connected by a torsion one-way clutch spring 68. The pin clutch solenoid 62 has an arm 62*a* normally in a blocking position with a pin 69*a* on a collar 69 secured to the upper end of the clutch spring. When so blocked the friction engagement of the drive shaft with the spring tends to unwind the spring, thereby releasing it from the shaft and holding the pinion gear 67 at standstill. However, the instant the pin clutch solenoid 62 is operated the collar 69 is released and the clutch spring grips the drive shaft under its own tension to effect an instantaneous engagement of the clutch. Each momentary operation of the pin clutch solenoid 62 therefore effects one complete revolution of driven movement of the gear 67.

Figures 6, 7, 8, 9:
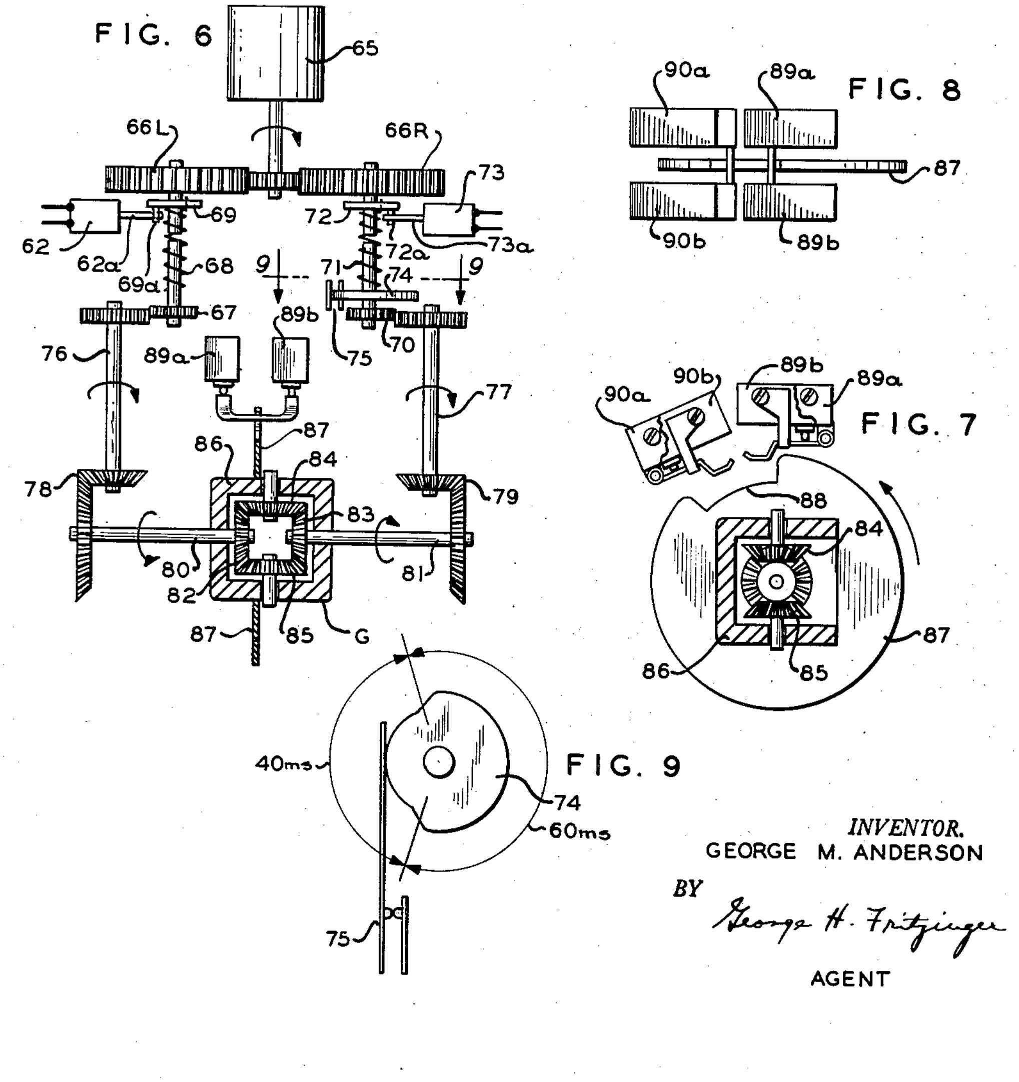
FIGURE 6 is a view of the dial pulse storage and regenerating mechanism.
FIGURES 7 and 8 are side and plan views of the portion of the above mechanism comprising the memory disk and switches controlled thereby.
FIGURE 9 is a top plan view taken on the line 9—9 of FIGURE 6 showing the pulse regenerating cam and dial switch operated thereby.

In a similar way the gear 66R is coupled to a pinion gear 70 through a torsion one-way clutch spring 71 having a collar 72 secured to its upper end and provided with a pin 72*a* normally blocked by a second pin clutch solenoid 73. In this case the drive shaft of gear 70 carries also a cam 74 for operating a dial pulse switch 75 to generate precise uniform dial pulses at an exact speed of ten per second when the pin clutch 73 is operated. As shown in FIGURE 9, the cam 74 is so shaped to open the switch 75 and start therefore the dial pulse about 20 milliseconds after the cam begins rotation and to terminate the dial pulse about 60 milliseconds thereafter.

The gears 67 and 70 have a 2 to 1 step-down coupling ratio to respective shafts 76 and 77, and these shafts are in turn coupled through 2 to 1 step-down bevel gearings 78 and 79 to drive a pair of coaxial shafts 80 and 81 in opposite directions respectively at approximately 157.4 and 150 r.p.m. The shafts 80 and 81 are interconnected through a differential gearing of a gear box G. This gear box comprises confronting bevel gears 82 and 83 on the shafts 80 and 81 respectively and planetary bevel gears 84 and 85 journaled to a yoke 86 which itself is journaled on the shafts 80 and 81. The yoke therefore receives a rotational movement equal to one-half the differential between that of the gears 82 and 83. Mounted on this yoke is a so-called memory disk 87 which stands normally in the position shown in FIGURE 7. This yoke is turned counterclockwise as telephone numbers are dialed to represent a temporary storage of the telephone letters and digits according to its units of displacement, as will appear.

The memory disk has a peripheral slot 88 of about 45° length engaged by the operating arms or buttons of a pair of micro switches 89*a* and 89*b* positioned for immediate operation when the memory disk is turned counterclockwise, and engaged by the operating arms or buttons of a pair of micro switches 90*a* and 90*b* positioned to be operated by the memory disk when the same is turned about 22½°—i.e., about one-half the length of the slot 88—in a counterclockwise direction from home position. The operation of recording successive letters and digits of a telephone number is herein next described with further reference to the schematic circuit diagram of FIGURE 5. As an aid to following the detailed description in the succeeding paragraphs, a general description of the operation is herein first made. The motor 65 of the storage mechanism 66—87 is herein considered as running continuously. The drive motor 20 of the record mechanism is however started by the first dial pulse of each letter or digit dialed, by such pulse activating the pin clutch solenoid 62 and starting counterclockwise rotation of the memory disk 87 to operate the micro switch 89*a*, and this drive motor is then not stopped until the memory disk is returned to home position. Generation of the perfect dial pulses which are recorded on the record medium is however not started until about 470 milliseconds after the first pulse is received from the telephone dial, this period being determined by an approximate 70 millisecond delay in the storage mechanism 66—87 and a 400 millisecond delay measured by the advance clutch C in operating the switch AC4. Therefore, upon dialing each letter or digit of a telephone number, the drive motor 20 is started and moves the recorder head to provide first a blank track of about 470 milliseconds duration on the record medium and to provide then a recordation of as many perfect pulses as represents the particular letter or digit dialed, at which time power to the drive motor relay 92 is cut off. However, in order to delay drop out of this relay and provide for an increased interdigital spacing on the record between the recorded pulse trains of successive letters or digits dialed, a diode 92*a* is connected across the relay coil 92 with such polarity relative to the current sources 63 and 95 that the diode will not retard pull in of the relay but will delay drop out by about 80 milliseconds. Since the pulse train of each recorded letter or digit is preceded by the 470 millisecond blank track above described, there is provided of the order of 550 milliseconds interdigital spacing on the record between successive pulse trains representing the successive letters and digits of a telephone number.

The gear 66L is turned at a rotational speed of the pulse rate of the fastest permissible dial as before mentioned. When a letter or digit is dialed each successive dial pulse will instantly release the pin clutch solenoid 62 from the pin collar 69 to cause the gear 67 to be driven one full revolution. However, if the dial is a slow one having for example a rate of 1 pulse each 105 milliseconds, the pin clutch solenoid 62 will momentarily block the pin collar 69 at the end of each revolution and allow only one revolution of the gear 67 for every 105 milliseconds notwithstanding the faster rate of rotation of the gear 66L.

At the start of dialing a letter or digit the second pin clutch solenoid 73 is not energized, with the result that the movement of the gear 67 responsive to the dialing pulses is transmitted at an 8 to 1 step-down ratio to the memory disk 87 of the differential gear mechanism. Thus, the first dial pulse will cause the memory disk 87 to be turned counterclockwise approximately 45°, two pulses will cause it to be turned approximately 90°, etc. At the beginning of this movement of the memory disk micro switches 89*a* and 89*b* are operated and at about 50 milliseconds from the start of the memory disk the micro switches 90*a* and 90*b* are operated. Simultaneously, as the first dial pulse is supplied to the pin clutch solenoid 62 by the opening of the dial switch 59, a dial pulse is supplied also to a motor relay 92 through switch 89*a* at its upper contact, reset switch section 101*b* at its left contact and record switch 61*b* at its left contact. This first dial pulse operates the motor relay 92 to close switch 94 and start the motor 20 driving the recorder head across the record tape. The micro switch 89*a* is a make-before-break switch as indicated in FIGURE 5, and is fully operated well within the 60 millisecond duration of the first current pulse to provide a holding circuit for the motor relay from the voltage source 95 and to disconnect that source from the circuit of the pin clutch solenoid 62 before a next pulse can arrive. The motor relay is therefore operated by the first pulse and retained by its holding circuit to cause the recorder head to be driven continuously across the record until the memory disk is returned home to restore the micro switch 89*a* to its initial position.

When the micro switches 90*a* and 90*b* are next operated, power is supplied to the coil 47 of the advance clutch from power source 95 through switch 89*a* at its lower contact, switch 90*b*, lead line 96, switch 97 of an advance clutch relay 98 and the coil 47 to ground. This means that after approximately 50 milliseconds from the start of the first dial pulse, the advance clutch C begins measuring time and continues doing so until its first switch AC4 set at 400 milliseconds is operated. During this 450 millisecond period from the start of the first dialing pulse of a digit or letter of a telephone number the recording head is driven across the record without recording thereon. Also, during each such 450 millisecond interval the memory disk is turned counterclockwise by as many 45° intervals as the number of the digit dialed. For instance, if the digit "1" is dialed it is turned approximately 45° and stands still then until the 450 millisecond period elapses, if the digit "2" is dialed the disk is turned approximately 90° and then stands still during the remainder of the 450 millisecond interval, and so on to the dialing of as high as digit "5." When a digit "5" or higher is dialed, the advance clutch will have closed the switch AC4 before the series of dialing pulses is completed. Closure of the switch AC4 provides power to the advance clutch relay 98 from the source 99. Operation of relay 98 opens the switch 97 to drop out the advance clutch and cause return of the arm 49 to zero position; and concurrently the pin clutch solenoid 73 is operated to start driving the gear 83 of the differential gear box G in the reverse direction to that of the gear 82. This reverse drive of the gear 83 substantially counteracts any further advance of the memory disk from the gear 82 to cause the memory disk to stand substantially still so long as dialing pulses above "5" keep coming through to keep pin clutch solenoid 62 operated. When the solenoid 62 drops out, however, the memory disk starts returning to home position by its coupling to the motor 65 through the drive clutch 71. Thus, the memory disk can turn through a maximum of only about five units (225°) and will then stand still or start returning immediately depending upon whether a number "5" digit or higher has been dialed.

The instant the pin clutch solenoid 73 is operated the dial pulsing cam 74 is rotated to start pulsing the dial switch 75 to generate dial pulses of perfect duration and perfect periodicity. As before mentioned, each pulse so generated is started 20 milliseconds after the start of rotation of the cam with the result that the first recorded pulse occurs about 470 milliseconds from the start of the first dial pulse from the telephone dial mechanism 55. The generation of perfect dial pulses continues until the memory disk is returned home because the advance clutch relay 98 and the pin clutch solenoid 73 are both provided with a holding circuit from the source 99 through the switch 100 of the advance clutch relay 98 the instant this relay is operated, and this holding circuit is not broken until the micro switch 90*a* is dropped out by the memory disk returning to within 50 milliseconds of home position. The fact that the pin clutch solenoid 73 is dropped out when the memory disk is still 50 milliseconds from home position does not prevent a full return of the memory disk to home position or completion of the pulse then underway since the pin clutch is of the integral revolution type.

From the foregoing description it is seen that the spring clutch 71 is engaged approximately 450 milliseconds after the start of dialing a number, that it stays engaged for as many 100 millisecond intervals as the number of the digit dialed, and that while the clutch spring is so engaged the cam disk 74 is turned precisely at one revolution each 100 milliseconds to generate successive pulses each about 60 milliseconds long as determined by the peripheral length of the raised portion or dwell of the cam 74. Thus, imperfect dial pulses stored in terms or units of displacement of the memory disk 87 from home position are utilized to control the duration of operation of the precision pulse generating means.

At the end of a dialing operation, the motor relay 92 is dropped out by return of the switch 89*a* while dial switch 59 is closed, and the motor is stopped. However, the carriage stands in its advance position at the end of the last recorded pulse train until the carriage-return solenoid 32 is activated. It is desired that before the carriage is so returned that it be first advanced for a further 1500 millisecond duration without recordation of any signal for the purpose of effecting automatic return of the carriage when the recorded signals are next played back.

The means for advancing the carriage by the 1500 millisecond interval and then returning the same to home position at the end of a recording operation is activated by pressing a manual reset control generally referred to as 101 but which comprises three switch sections 101*a*, 101*b* and 101*c* mechanically tied together for simultaneous operation as indicated by the tie-line in FIGURE 5. The switch section 101*a* connects the carriage-return solenoid 32 through the advance switch AC15 to the power source 102. The switch section 101*b* is for connecting the power source 103 to the motor relay 92 through record switch 61*b*. The switch section 101*c* is for connecting power source 104 through switch 105 of advance clutch relay 98 and lead wire 106 to the advance clutch coil 47. Thus, upon pressing the reset control 101, the motor is started to advance the carriage, the advance clutch is engaged to start measuring time from the moment the motor was started, and switches AC4 and AC10 are placed in disabled circuits since switch 90*a*, now in open position, disables the advance clutch relay and the pin clutch solenoid 73, and dial switch section 107*a* disables advance clutch switch AC10. Therefore, the carriage drive proceeds to provide an unrecorded track at the end of the last recorded digit for a duration of 1500 milliseconds and then to close switch AC15 to actuate the carriage-return solenoid 32. Operation of this solenoid 32 effects return of the carriage and releases the reset control 101 as before described. Upon the return of the carriage the clutch solenoid 35 is energized by any suitable means as described, for example, in the Kobler et al. application supra, to lock the feed nut to the carriage so that the carriage will be again advanced when the motor is next started.

When the recorded digits and letters of a telephone number are to be played back and fed into a telephone line to dial a selected subscriber's number, a manual dial switch generally referred to as 107 is pressed but with the record switches 61*a* and 61*b* being first moved to their off positions. The dial switch comprises a section 107*a* in series with the advance clutch switch AC10 via a circuit 108 running from the power source 102 to the carriage return solenoid 32, a section 107*b* in series with record switch 61*b* at its off side via a circuit 109 running from a power source 110 to the motor relay 92, and a section 107*c* in series with the micro switch 89*b* via a circuit 106 running from the power source 104 through switch 105 to the advance clutch coil 47. These dial switches are mechanically tied together for simultaneous operation as indicated by the tie-lines in FIGURE 5.

Operation of the dial switch 107 immediately activates the motor relay 92 through switch 61*b* at its off side and dial switch section 107*b* to start driving the head 17, operating as a reproducer across the record to pick up the recorded dial pulses. These reproduced pulses are amplified and fed into a dial relay 111 to operate a dial switch 112 now connected in shunt with the pin clutch solenoid 62 through the record switch 61*a* at its off side. In other words, dial switch 112 now replaces dial switch 59 which was in the circuit during recording. For example, the dial switch 112 normally shorts the pin clutch solenoid 62 but causes this solenoid to be pulsed from the power source 63 each time the dial switch is opened, the same as occurred when the dial switch 59 is opened during recording. Also, the instant the dial switch 107 is pressed the advance clutch is operated through dial switch section 107*c*, micro switch 89*b*, switch 105 and lead wire 106.

In 400 milliseconds after the dial switch 107 is pressed, the advance switch AC4 is closed but with no immediate effect because the micro switch 90*a* is now open. In 470 milliseconds from the instant the dial switch is pressed, the first pulse is picked up from the record to energize the pin clutch solenoid 62 and start storage movement of the memory disk 87. About 10 milliseconds later, which is about 480 milliseconds from the instant the dial switch was pressed, the memory disk operates switches 89*a* and 89*b*. Operation of micro switch 89*a* is now without immediate effect because this switch is disconnected from the motor relay by reason of the record switch 61*b* being in its off position and switch 90*b* is not yet operated. However, opening of the switch 89*b* drops out the advance clutch C effecting immediate return of its arm 49 to zero position with resultant reopening of the advance switch AC4.

About 50 milliseconds after the first dial pulse is picked up, which is about 520 milliseconds from the instant the dial control was pressed and about 40 milliseconds after drop out of the advance clutch, the micro switches 90*a* and 90*b* are closed. Closure of micro switch 90*b* restarts the advance clutch C through switch 97. Closure of micro switch 90*a* has no immediate effect because advance switch AC4 is now open as is also switch 100. About 400 milliseconds thereafter, which is about 920 milliseconds from the instant the dial control was pressed, the advance switch AC4 is again closed. This now activates the advance clutch relay 98 and pin clutch solenoid 73. Operation of the relay 98 opens the switch 97 to drop out the advance clutch C, and closes switch 100 to provide a holding circuit for both the relay 98 and the pin clutch solenoid 73 after the switch AC4 is opened by the drop out of the advance clutch. Operation of the pin clutch solenoid starts generation of perfect dial pulses from the switch 75 and begins annulling further advance of the memory disk 87, the same as during recording. When the pulses picked up from the record cease, the memory disk begins returning to home position and in its last unit (45°) of movement it opens the switches 90*a* and 90*b* and then about 40 milliseconds later it returns the switches 89*a* and 89*b*. The opening of switch 90*a* drops out both the advance clutch relay 98 and pin clutch solenoid 73, the effect of the latter being to stop the generation of the pulses from the dial switch 75 upon the completion of the pulse then underway. The drop out of relay 98 returns the switch 97 but without immediate effect because the switch 90*b* is now open. But the closing of switch 105 responsive to drop out of the relay 98 prepares the way so that when the switch 89*b* next closes the advance clutch solenoid is again activated. Thus, the advance clutch begins measuring about 10 milliseconds before the memory disk is returned home.

The next series of pulses to be picked up from the record are at a minimum interdigital spacing of about 550 milliseconds as before described. Therefore, the last of the generated pulses is completed before the first of the next series of pulses is picked up from the record. The operation of the playback mechanism therefore proceeds to pick up and recreate the second series of pulses the same as with the first series and so on, until all of the successive series of pulses are picked up and regenerated.

When, however, the reproducer runs into a blank space of 1000 milliseconds or more—which it will do at the end of the last series of pulses because a blank track of 1500 milliseconds duration was provided deliberately by the reset operation after recording the full telephone number—the operation is as follows.

The advance clutch which was activated at about the end of the last series of pulses picked up from the record will now run through the first 400 millisecond interval and beyond because the advance switch AC4 is now in an open circuit by reason of micro switch 90*a* being open, it being understood that the switch 90*a* now remains open because there are no pulses being picked up from the record to activate the pin clutch solenoid 62 and drive the memory disk 87 from its home position. The advance clutch will continue therefore to measure up to 1000 millisecond duration until the advance switch AC10 is closed. The closing of advance switch AC10 operates the carriage-return solenoid 32 through the dial switch section 107*a*. Operation of the solenoid 32 releases the latch on the feed nut and drops out the dial switches 107*a*, 107*b* and 107*c*. Release of the feed nut latch causes the carriage to be snapped back to home position by the spring tensioned drum. The opening of the dial switch 107*a* drops out the carriage-return solenoid 32, the opening of switch 107*b* drops out the motor relay 92 and stops the motor 20, and the drop out of the dial switch 107*c* drops out the advance clutch C. Therefore, upon the reproduce head encountering a blank space on the record of a duration of 1000 milliseconds or longer, the machine is restored fully to its original condition.

The embodiment of my invention herein particularly shown and described is intended to be illustrative and not limitative of my invention since the same is subject to changes and modifications without departure from the scope of my invention, which I endeavor to express according to the following claims.

I claim:

1. A telephone dialing system comprising a manually operable dial, means driven at a fixed speed for generating a precise pattern representative of respective letters and digits dialed, temporary storage means operated in one direction from a home position in proportion to each letter or digit dialed, means for starting said generating means a predetermined interval after each start of said storage means, means for returning said storage means in proportion to the operation of said generating means, and means controlled by said storage means as the same reaches home position for stopping said generating means.

2. A telephone dialing system comprising a manually operable dial for producing one or more pulses representative of respective letters and digits dialed, temporary storage means operated according to each letter or digit dialed, means for generating a precise pattern of uniform pulses at a fixed frequency, means for starting said generating means after a predetermined interval from the moment the first pulse is received from said dial when a letter or digit is manually dialed, means for cancelling out said storage means by said generating means, and means for stopping said generating means by said storage means when the number of generated pulses is equal precisely to the number of pulses received from said dial.

3. A telephone dialing system comprising a source of trains of dial pulses spaced from each other and representing respective digits and letters of telephone numbers, a differential system having two drive members and a planetary driven member moved according to the differential in the movement of said drive members, motor means, a first one-revolution clutch controlled by said dial pulses of each train for coupling said motor means to one of said drive members and imparting a movement thereto in one direction through a distance depending on the number of dial pulses in the train whereby to advance said planetary means from home position, means for measuring a predetermined time interval from the receipt of the first pulse of said one train, a second one-revolution clutch between said motor means and said other drive means engaged by said measuring means at the expiration of said predetermined interval for moving said other drive member in a direction to return said planetary means to home position, means connected to said other drive member for generating precise uniform pulses at a fixed frequency from the instant said second clutch is engaged, and means operative by return of said planetary means to home position for disengaging said second clutch when the number of generated pulses equals that of said one train.

4. The dialing system set forth in claim 3 including a telephone dial for producing said sources of pulses, and drive transmissions from said motor means through said first and second clutches respectively to move said one drive member at a speed corresponding to a fast telephone dial and to move said second drive member at a speed corresponding to a perfect telephone dial.

5. The dialing system set forth in claim 4 including means operated intermittently by successive dialing pulses for controlling said first one-revolution clutch to permit only a fixed distance of driven movement of said one drive member for each dial pulse.

6. The telephone dialing system set forth in claim 4 wherein said measuring means is set to measure a predetermined time interval equal to a fraction of the time required for said telephone dial to return from a fully operated position to home position.

7. A telephone dialing and recording system comprising a manually operable dial, a recording machine, means for starting said recording machine by the first pulse from said dial when a letter or digit is dialed, temporary storage means operated in one direction in proportion to the number of pulses of any one train from said dial, means operated by said recording machine for measuring a predetermined time interval, means for generating precise uniform pulses at a fixed frequency, means controlled by said measuring means upon expiration of said predetermined time interval for starting said generating means and feeding the pulses therefrom into said recording machine, means operable by said generating means for imparting a restoring movement to said storage means, and means for stopping said generating means by said storage means when the generating means has produced a number of pulses equal exactly to the number of pulses representing the letter or digit dialed.

8. The combination set forth in claim 7 including means controlled by said storage means for stopping said recording means at the same time as said generating means is stopped.

9. The combination set forth in claim 8 including manual means operable to restart said recording means and cause the same to run for a time interval substantially greater than said predetermined time interval, and means operable upon expiration of said greater time interval for restoring the recording machine to its starting condition.

10. A telephone dialing system including a record medium bearing trains of pulses representing letters and digits of respective telephone numbers, means for picking up said pulses from said record medium, means for generating uniform pulses at a fixed frequency, means operable by the pulses picked up from the record medium for effecting a temporary storage thereof in terms of displacement of the storage means from a home position, means operative a predetermined interval from the start of operation of said storage means for starting said generating means and concurrently proportionally returning said storage means to home position, and means operative upon return of said storage means to home position for stopping said generating means.

11. A telephone dialing system including a record medium having a track bearing recorded trains of pulses representing letters and digits of telephone numbers, said trains starting at a first predetermined interval from the beginning of said track and being separated by interdigital intervals longer than said first interval, a reproducer head in registration with the beginning of said track, means for driving said head along said track to pick up said pulses, manual start means for said driving means, means for generating precise pulses of uniform frequency, timing means operated by movement of said head and controlled by pickup of pulses from the record for starting said generating means responsive to the differential between the number of pulses of each train picked up from the record and the number of corresponding pulses produced by said generating means with a delay after pickup of the first pulse from the record equal approximately to said first predetermined interval, and means for stopping said generating means after scanning of each recorded train when the number of generated pulses equals exactly the number of pulses in the respective train.

References Cited in the file of this patent

UNITED STATES PATENTS 2,921,142 Tinus ------------------ Jan. 12, 1960